United States Patent Office
2,788,095
Patented Apr. 9, 1957

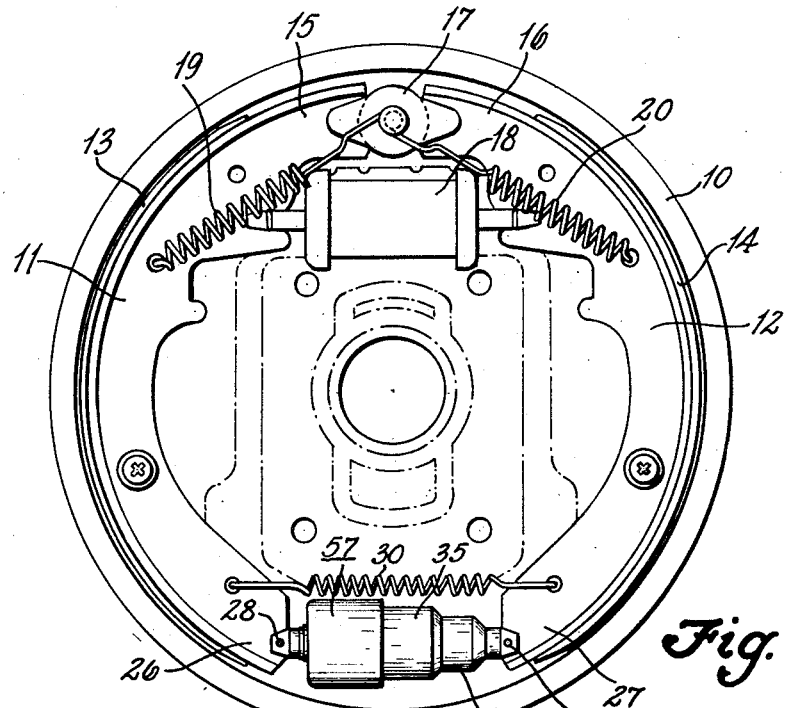
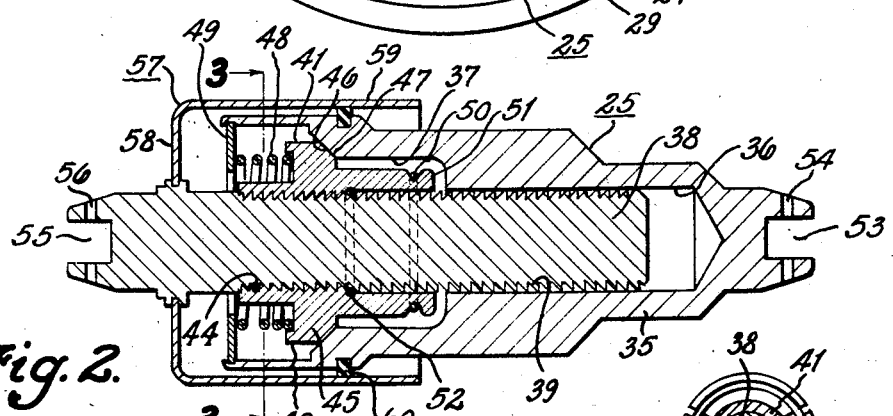
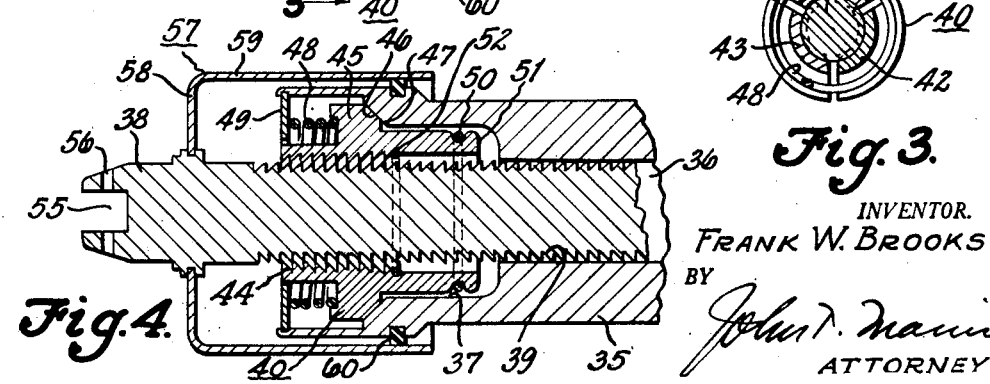

2,788,095

AUTOMATIC WEAR ADJUSTOR

Frank W. Brooks, Dayton, Ohio, assignor to General Motors Corporation, Detroit, Mich., a corporation of Delaware Application July 29, 1953, Serial No. 371,117

1 Claim. (Cl. 188—196)

This invention relates to brakes for automotive vehicles, and particularly to a wheel compensting device that compensates automatically for wear of the brake linings or the brake drum or both.

An adjusting device that compensates automatically for wear of the lining elements of a brake cause periodic spreading of the brake shoes relative to each other to maintain substantially constant the clearance between the brake lining and the brake drum. Such an automatic adjusting device eliminates the necessity for frequent re-adjustment of the brake pedal stroke during the life of the brake lining.

However, when new brake linings are installed, it is necessary that the automatic adjusting device be capable of being returned to its initial position.

It is therefore an object of this invention to provide an automatic wear adjusting device for brakes wherein an axial extension of the device is provided for wear compensation of the brakes by a ratchet action, and wherein extension or contraction of the adjusting device is also provided by rotative movement to provide for initial adjustment of the length of the device and return thereof to its initial position after extension resulting from operation in a brake mechanism.

Another object of the invention is to provide a wear compensating or adjusting device accomplishing the foregoing object wherein the multiple jaw ratchet device threadedly engages a movable member in such a manner that the axial extension of the device is occasioned by ratchet action and either contraction or extension of the device can be obtained by rotative action.

Further objects and advantages of the present invention will be apparent from the following description, reference being had to the accompanying drawings wherein a preferred form of the invention is clearly shown.

In the drawings:

Figure 1 is an elevational view of a brake mechanism incorporating the wear compensating or adjusting device of this invention.

Figure 2 is a longitudinal cross sectional view of the adjusting device.

Figure 3 is a cross sectional view taken along line 3—3 of Figure 2.

Figure 4 is a partial longitudinal cross sectional view similar to Figure 2 but illustrating the operative position of the device.

In this invention the brake that incorporates the wear compensating or adjusting device of this invention includes a brake drum 10 carried on the wheel of a motor vehicle in conventional manner. Within the brake drum 10 there is positioned the two brake shoes 11 and 12, carrying the linings 13 and 14 respectively. The two adjacent ends 15 and 16 of the shoes 11 and 12 respectively engage an immovable anchor pin 17. An actuating device comprising a hydraulically actuated wheel cylinder 18 is positioned between the brake shoes 11 and 12 to expand the shoes into engagement with the drum 10. A tension spring 19 extends between the brake shoe 11 and the anchor pin 17, a corresponding spring 20 extending between the brake shoe 12 and the anchor pin 17.

A wear compensating or automatic adjusting device 25 is positioned between the other two adjacent ends 26 and 27 of the brake shoes by the pins 28 and 29. A tension spring 30 extends between the ends 26 and 27 of the brake shoes to retain the adjusting device in a contracted condition, as hereinafter explained.

The spring 30 is of less strength then the confined action of the springs 19 and 20 whereby the first movement of the brake shoes 11 and 12 caused by action of the wheel cylinder 18 results in spreading movement of the ends 26 and 27 of the brake shoes into engagement with the brake drum 10. This initial action is that which provides for operation of the automatic adjusting device 25.

The automatic adjusting device 25 comprises a first cylindrical member 35 that has a longitudinally extending chamber 36, the forward end of the chamber 36 having an enlarged chamber 37. The wall of the chamber 36 is a smooth bore so as to receive the second member 38 in a telescopic manner. The member 38 is therefore axially slidable within the member 35 and can be rotated therein.

The second member 38 has a buttress thread 39 on the outer periphery of the same, the member 38 being cylindrical in shape to fit within the cylindrical chamber 36 heretofore described.

A multiple jaw ratchet device 40 comprising the ratchet jaws 41, 42, and 43 is carried upon the second member 38. Each of the jaws 41, 42, and 43 have their inner surface provided with a buttress thread 44 that corresponds to the buttress thread 39 whereby when the jaws 41, 42, and 43 are placed upon the member 38, the buttress thread 39 of the member 38 will mesh with the buttress threads 44 in the jaws 41, 42, and 43.

Each of the jaws 41, 42, and 43 has a radially extending projection 45 that is provided with an angular face 46 that engages an angular face 47 that forms a part of the wall of the chamber 37 in the member 35.

A compression spring 48 extends between the jaws 41, 42, and 43 and an end wall 49 that at least partially closes the end of the chamber 37. The spring 48 thus resiliently urges the jaws 41, 42, and 43 of the multiple ratchet device 40 against the angular wall 47 to resiliently retain the jaws in operative engagement with the member 38.

A circular contracting spring 50 is provided around the extending ends 51 of the jaws 41, 42, and 43 tending to hold the jaws upon the member 38. A circular expansion spring 52 is provided internally of the extension 51 to expand the jaws outwardly radially from the member 38.

The member 35 has a slot 53 at one end thereof that receives the end 27 of the brake shoe 12, the pin 29 extending through the hole 54 provided for the same. Similarly, the projecting end of the member 38 has a slot 55 that receives the end 26 of the brake shoe 11, a hole 56 being provided to receive the pin 28.

The multiple jaw ratchet device 40 is enclosed by a cover member 57 that has the bottom wall 58 thereof positioned on the projecting end of the member 38. The sidewall 59 of the cover 57 partially encloses the member 35, a dirt seal 60 being provided between the inner surface of the wall 59 and the member 35 to prevent entry of dirt into the multiple jaw ratchet device 40.

When the automatic adjusting device 25 is placed between the ends 26 and 27 of the brake shoes 11 and 12, initial adjustment for the length of the adjusting device can be made by rotating the member 38 within the multiple jaw ratchet device 40. The adjusting device 25 can then be assembled between the brake shoes 26 and 27. Also, if further adjustment is required after installation of the adjusting device 25, such adjustment can be made by causing axial movement of the member 38 relative to the member 35 whereby the jaws 41, 42, and 43 will expand radially, as illustrated in Figure 4, to permit such axial movement between the members. When the adjusting device is in operation in a brake, the normal application of the brakes will cause the ends 26 and 27 of the brake shoes 11 and 12 to expand first, as hereinbefore described. Such movement will cause axial movement between the member 38 and the member 35 tending to extend the same. Normally, the buttress threads 39 and 44 prevent contraction of the members 38 and 35 relative to one another.

So long as the extension movement caused by movement of the shoes 11 and 12 is less than the distance between adjacent teeth of the ratchet teeth or buttress threads 39 and 44, no longitudinal extension of the adjusting device will be occasioned. However, when the movement of the ends 26 and 27 of the brake shoes is at least equal to the distance between adjacent threads of the ratchet or buttress threads 39 and 44, the radial expansion of the jaws will allow the buttress thread 39 of the member 38 to move forwardly relative to the buttress thread 44 of the jaws 41, 42, and 43, an equivalent distance so that subsequent closing of the jaws will cause them to fall into a subsequent thread row.

Thus, while each action of the brake causes radial expansion of the multiple jaw ratchet device, yet the adjusting device will extend its length only when the relative movement between the members 35 and 38 is at least equal to the distance between adjacent threads of the ratchet or buttress threads 39 and 44.

While the form of embodiment of the invention as herein disclosed constitutes a preferred form, it is to be understood that other forms might be adopted as may come within the scope of the claim which follows:

What is claimed is as follows:

A wear compensating device for a brake, comprising, a first member having a longitudinally extending chamber, a second member telescopically received within said first member axially and rotatively movable therein and extending from one end thereof, said second member having a ratchet thread thereon, a plurality of separate and cooperating jaws each having a corresponding ratchet thread and positioned on and cooperatively with the other jaws encircling said second member within said chamber with the ratchet threads thereof in meshing engagement with that on said second member, an annular spring around one end of said jaws urging the said end of the jaws radially inwardly and a second annular spring internally of said jaws between opposite ends thereof urging the same radially upwardly, said jaws and a wall of said chamber having matching conical surfaces to urge said jaws radially of said second member on axial movement of the jaws relative to said second member, said first member having a wall closing one end of said chamber and through which said second member projects, resilient means between said wall and said jaws for resilient axial urgence thereof for retention of the jaws in engagement with said second member whereby to provide for resilient ratchet action of said jaws on said second member upon axial movement between said first and second members at least equal to the distance between adjacent ratchet threads, said ratchet threads also providing for rotative movement between the said two members for extension or contraction thereof.

References Cited in the file of this patent

UNITED STATES PATENTS

| | | |
|---|---|---|
| 1,147,777 | Anderson | July 27, 1915 |
| 1,157,721 | Price | Oct. 26, 1915 |
| 2,018,754 | White | Oct. 29, 1935 |
| 2,168,646 | Goepfrich | Aug. 8, 1939 |

FOREIGN PATENTS

| | | |
|---|---|---|
| 553,112 | Great Britain | May 7, 1943 |
| 752,002 | France | July 3, 1933 |